United States Patent
Chen et al.

(10) Patent No.: US 10,417,805 B2
(45) Date of Patent: Sep. 17, 2019

(54) METHOD FOR AUTOMATIC CONSTRUCTING THREE-DIMENSIONAL INDOOR SCENARIO WITH BEHAVIOR-CONSTRAINED

(71) Applicant: BEIHANG UNIVERSITY, Beijing (CN)

(72) Inventors: Xiaowu Chen, Beijing (CN); Qiang Fu, Beijing (CN); Bin Zhou, Beijing (CN); Qinping Zhao, Beijing (CN); Xiaotian Wang, Beijing (CN); Bo Gao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/847,808

(22) Filed: Dec. 19, 2017

(65) Prior Publication Data
US 2019/0057538 A1    Feb. 21, 2019

(30) Foreign Application Priority Data
Aug. 21, 2017   (CN) .......................... 2017 1 0719859

(51) Int. Cl.
| | |
|---|---|
| G06K 9/00 | (2006.01) |
| G06T 17/05 | (2011.01) |
| G06T 17/00 | (2006.01) |
| G06T 15/04 | (2011.01) |

(52) U.S. Cl.
CPC .......... *G06T 15/04* (2013.01); *G06K 9/00201* (2013.01); *G06T 17/00* (2013.01); *G06T 17/05* (2013.01); *G06T 2210/04* (2013.01); *G06T 2215/12* (2013.01)

(58) Field of Classification Search
CPC ...................................................... G06T 17/00
See application file for complete search history.

(56) References Cited

U.S. PATENT DOCUMENTS

| | | | |
|---|---|---|---|
| 2011/0244901 A1* | 10/2011 | Sugahara .............. | H04W 16/18 455/501 |
| 2013/0259308 A1* | 10/2013 | Klusza ............... | G06K 9/00624 382/103 |
| 2017/0076016 A1* | 3/2017 | Mir Ahmadi ....... | G06F 17/5004 |
| 2018/0137191 A1* | 5/2018 | Yan ..................... | G06F 16/9535 |
| 2018/0365898 A1* | 12/2018 | Costa ................... | G06T 19/006 |

* cited by examiner

*Primary Examiner* — Grace Q Li
(74) *Attorney, Agent, or Firm* — J.C. Patents

(57) ABSTRACT

Provided is a method for automatic constructing a three-dimensional indoor scenario with behavior-constrained, including: determining a room, parameter of the room and a first behavioral semantics according to entered information; obtaining a corresponding first object category according to the first behavioral semantics; determining a corresponding first reference layout and a three-dimensional model of objects in the room according to the first object category and the parameter of the room; and directing and generating a three-dimensional indoor scenario in the room according to the first reference layout and the three-dimensional model.

9 Claims, 7 Drawing Sheets

US 10,417,805 B2

METHOD FOR AUTOMATIC CONSTRUCTING THREE-DIMENSIONAL INDOOR SCENARIO WITH BEHAVIOR-CONSTRAINED

CROSS-REFERENCE TO RELATED APPLICATION

This application claims priority to Chinese Patent Application No. 201710719859.1, filed on Aug. 21, 2017, which is hereby incorporated by reference in its entirety.

TECHNICAL FIELD

The present invention relates to the field of modeling of a three-dimensional scenario and, in particular, to a method for automatic constructing three-dimensional indoor scenario with behavior-constrained.

BACKGROUND

A technology for modeling three-dimensional scenario can be conceived as a technology for constructing a virtual three-dimensional scenario. In the related art, the construction of a three-dimensional scenario may be realized according to collection of object data in reality based on the collected data, and thus reproduction of modeling of a realistic scenario is realized.

With the development of the three-dimensional scenario modeling technology and the abundance of model resources of indoor objects, in recent years, people are no longer satisfied with reproduction of modeling of the realistic scenario, how to automatically construct a three-dimensional scenario as requested has become an urgent problem in the art.

SUMMARY

The present invention provides a method for automatic constructing a three-dimensional indoor scenario with behavior-constrained to solve a problem of how to perform automatic constructing a three-dimensional scenario according to the requirement.

According to a first aspect of the present invention, a method for automatic constructing a three-dimensional indoor scenario with behavior-constrained is provided, including:

determining a room, a parameter of the room and a first behavioral semantics according to entered information;

obtaining a corresponding first object category according to the first behavioral semantics;

determining a corresponding first reference layout and a three-dimensional model of objects in the room according to the first object category and the parameter of the room; and directing and generating a three-dimensional indoor scenario according to the first reference layout and the three-dimensional model.

Alternatively, before the determining the room and the first behavioral semantics according to the entered information, further including: constructing a relation tree, where a root node of the relation tree is a behavioral semantics and remaining nodes of the relation tree are object categories;

the obtaining the corresponding first object category according to the first behavioral semantics includes:

determining, in the relation tree, a corresponding object category as the first object category according to the first behavioral semantics.

Alternatively, the constructing the relation tree includes:

constructing a data set for a planar layout;

obtaining in the objects of the planar layout, according to N behaviors of the objects interactively used by a user and M behavioral logics corresponding to each of the behaviors, one object category corresponding to each of the behavioral logics, where the object categories include at least one object;

semantically determining the behaviors to obtain a behavioral semantics thereof; and determining the root node according to the behavioral semantics and determining the remaining nodes according to the object categories to construct the relation tree.

Alternatively, the obtaining, according to the N behaviors of the objects interactively used by the user and the M behavioral logics corresponding to each of the behaviors, one object category corresponding to each of the behavioral logics specifically includes:

obtaining, in the objects of the planar layout, one object category corresponding to each of the behavioral logics according to first marked data, second marked data, third marked data, the N behaviors and the M behavioral logics corresponding to each of the behaviors, where the first marked data is marked data of the objects in the planar layout, the second marked data is marked data of the user in the planar layout, and the third marked data is marked data of a blank area in the planar layout.

Alternatively, before the obtaining, according to the N behaviors of the objects interactively used by the user and the M behavioral logics corresponding to each of the behaviors, one object category corresponding to each of the behavioral logics, further including:

dividing some or all objects in the planar layout into a first object group, a second object group and a third object group, where an object in the first object group is an object stayed by the user when an interactive terminal is used, and a time stayed by a preset user is in a first time length range; an object in the second object group is an object stayed by the user when an interactive terminal is used, and a time stayed by a preset user is in a second time length range; a maximum value of the first time length range is less than a minimum value of the second time length range; an object in the third object group is an object of an interactive terminal used by the user; and obtaining cross-linked data of objects in different object groups, where the cross-linked data is used to characterize a possibility that the objects in different object groups are simultaneously stayed and/or interactively used by the same user;

the obtaining, according to the N behaviors of the objects interactively used by the user and the M behavioral logics corresponding to each of the behaviors, one object category corresponding to each of the behavioral logics specifically includes:

selecting and determining the object in each object category according to the behaviors, the behavioral logics and the cross-linked data.

Alternatively, the determining the corresponding first reference layout and the three-dimensional model of the objects in the room according to the first object category and the parameter of the room includes:

determining, according to the first object category and the parameter of the room, a first scenario category to which the first reference layout belongs;

determining the first reference layout in candidate layouts according to the candidate layouts under the first scenario category, the first object category and the object therein as well as the parameter of the room, and selecting one of first object category; and selecting the three-dimensional model of the objects in a three-dimensional model library according to the blank area in the first reference layout and the object in the selected first object category.

Alternatively, the determining, according to the first object category and the parameter of the room, the first scenario category to which the first reference layout belongs includes:

determining the first scenario category according to the first object category, the parameter of the room and data about first probability, where the data about the first probability is used to indicate a probability that each object category occurs under different scenarios.

Alternatively, the determining the first reference layout in the candidate layouts according to the candidate layouts under the first scenario category, the first object category and the object therein as well as the parameter of the room includes:

dividing the room into at least one sub-room in a manner corresponding to division of each of the candidate layouts according to the candidate layouts and the parameter of the room, and determining an object in each sub-room;

calculating energy data for each candidate layout according to the sub-room and the object in the sub-room respectively; and selecting a candidate layout having the smallest energy data as the first reference layout.

Alternatively, the calculating the energy data for each candidate layout according to the sub-room and the object in the sub-room respectively includes:

calculating and obtaining a first room feature parameter of each sub-room;

calculating and obtaining a first object feature parameter corresponding to an object in each sub-room; and calculating and obtaining the energy data according to a second room feature parameter corresponding to the candidate layouts, a corresponding second object feature parameter, the first room feature parameter and the first object feature parameter, where the corresponding second object feature parameter is obtained according to the blank area corresponding to objects in the candidate layouts.

Alternatively, the directing and the generating the three-dimensional indoor scenario in the room according to the first reference layout and the three-dimensional model includes:

aligning corresponding lines in the first reference layout with corresponding lines of the sub-room in the room, where the sub-room in the room is obtained by dividing the room according to the first reference layout;

mapping the blank area in the first reference layout into the room; and placing the three-dimensional model in the room according to preset orientation information and preset position information in the first reference layout and results of the mapping.

A method for automatic constructing a three-dimensional indoor scenario with behavior-constrained provided in the present invention, determination of an object category and a layout based on requirements is achieved, and automatic construction of a three-dimensional scenario based on the requirements is further achieved by: determining a room and a first behavioral semantics according to entered information in order to determine the requirements; obtaining a corresponding first object category according to the first behavioral semantics; and determining a corresponding first reference layout and a three-dimensional model of objects in the room according to the first object category and the parameter of the room.

BRIEF DESCRIPTION OF DRAWINGS

In order to make technical solutions in embodiments of the present invention or the prior art clearer, accompanying drawings used in description of the embodiments of the present invention or the prior art will be briefly described hereunder. Obviously, the described drawings are merely some embodiments of present invention. For persons skilled in the art, other drawings may be obtained based on these drawings without any creative effort.

DESCRIPTION OF EMBODIMENTS

The technical solutions in the embodiments of the present invention will be described hereunder clearly and completely with reference to accompanying drawings in the embodiments of the present invention. Obviously, the described embodiments are only a part of embodiments of the present invention, rather than all embodiments of the present invention. All other embodiments obtained by persons of ordinary skill in the art based on the embodiments of the present invention without any creative effort shall fall into the protection scope of the present invention.

The terms such as "first", "second", "third", "fourth" and the like (if exists) in the description, the claims and the above drawings of the present invention are intended to distinguish similar objects but rather to describe a specific order or sequence. It will be appreciated that data used in this way is interchangeable where appropriate, such that the embodiments of the present invention described herein can be implemented, for instance, in a sequence in addition to those illustrated or described herein. Moreover, the terms such as "include", "have" and any variations thereof are intended to cover non-exclusive inclusions, for instance, processes, methods, systems, products or devices that include a series of steps or units are not limited to those steps or units that are listed clearly, but may include other steps or units that are not clearly listed or inherent to those processes, methods, products, or devices.

Technical solutions of the present invention will be described hereunder in detail with reference to specific embodiments. The following specific embodiments may be combined with each other, and for the same or similar concept or process, details may not be repeated in some embodiments.

Figure 1:
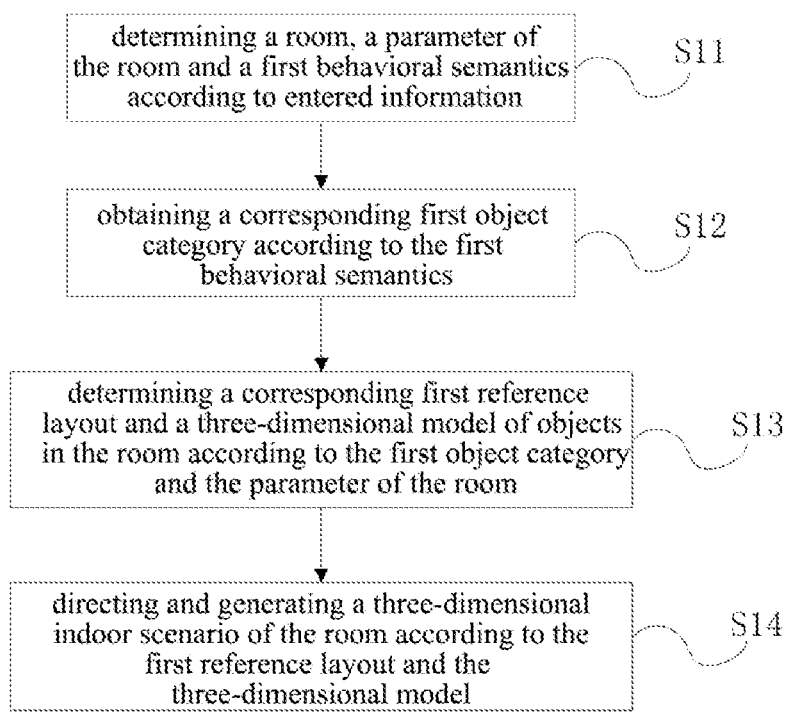
FIG. 1 is a first schematic flow chart of a method for automatic construction of a behavior-constrained three-dimensional indoor scenario according to the present invention.

FIG. 1 is a first schematic flow chart of a method for automatic construction of a behavior-constrained three-dimensional indoor scenario according to the present invention; with reference to FIG. 1, including:

S11, determining a room, a parameter of the room and a first behavioral semantics according to entered information.

The room may be conceived as a room where a three-dimensional scenario that needs to be constructed locates or a three-dimensional model of the room; the parameter of the room may be conceived as any parameter pertaining to construction of the room or the three-dimensional model of the room, which may include a shape of the room, a size corresponding to the shape or the like; a semantic behavior may be conceived as contents characterizing an indoor behavior of the user; the entered information may be any information that can be used to match the determined room, parameter of the room and first behavioral semantics.

S12, obtaining a corresponding first object category according to the first behavioral semantics.

In this embodiment, categories of objects are corresponding to a behavioral semantics, and during construction of a three-dimensional scenario, it is possible to realize the demand-based scenario construction through the correspondence.

S13, determining a corresponding first reference layout and a three-dimensional model of objects in the room according to the first object category and the parameter of the room.

The reference layout may be conceived as a preset drawing for realizing an indoor scenario layout, and the three-dimensional model of the objects may be conceived as a three-dimensional model preset by the object that can be added into a three dimensional scenario. Through the above steps, the layout and the model needed for constructing the three-dimensional scenario may be determined in the preset layout and model.

S14, directing and generating a three-dimensional indoor scenario of the room according to the first reference layout and the three-dimensional model.

According to a method for automatic constructing a three-dimensional indoor scenario with behavior-constrained provided in this embodiment, the determination of an object category and a layout based on requirements is achieved, and the automatic construction of a three-dimensional scenario based on the requirements is further achieved by means of: determining a room and a first behavioral semantics according to entered information in order to determine the requirements; obtaining a corresponding first object category according to the first behavioral semantics; and determining a corresponding first reference layout and a three-dimensional model of objects in the room according to the first object category and the parameter of the room.

Figure 2:
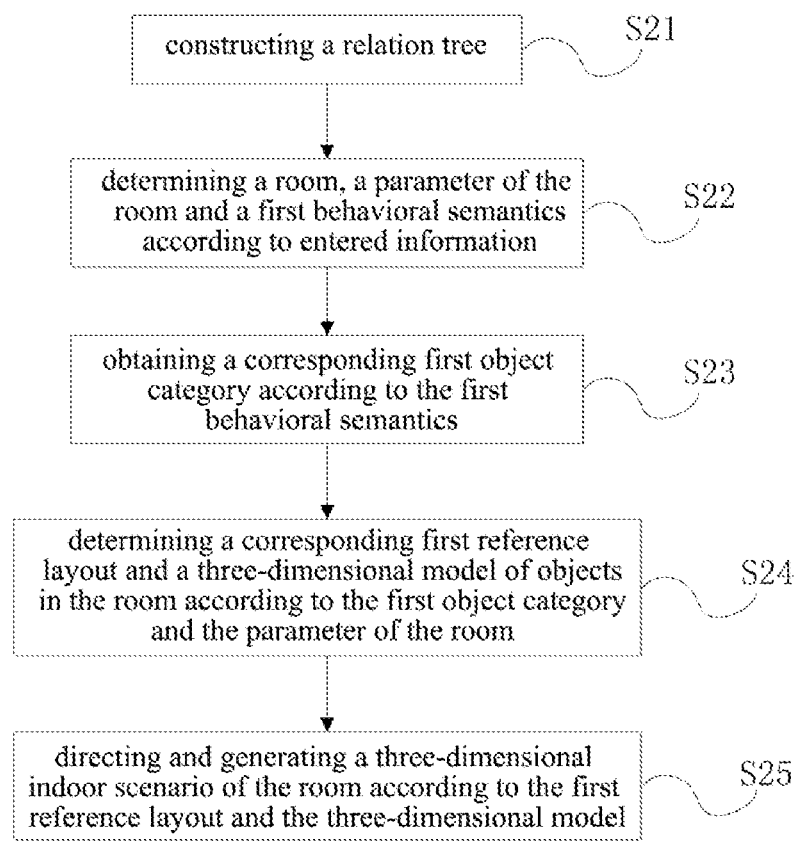
FIG. 2 is a second schematic flow chart of a method for automatic construction of a behavior-constrained three-dimensional indoor scenario according to the present invention.

FIG. 2 is a second schematic flow chart of a method for automatic constructing a three-dimensional indoor scenario with behavior-constrained according to the present invention; with reference to FIG. 2, including:

S21, constructing a relation tree, where a root node of the relation tree is a behavioral semantics and remaining nodes of the relation tree are object categories.

Figure 3:
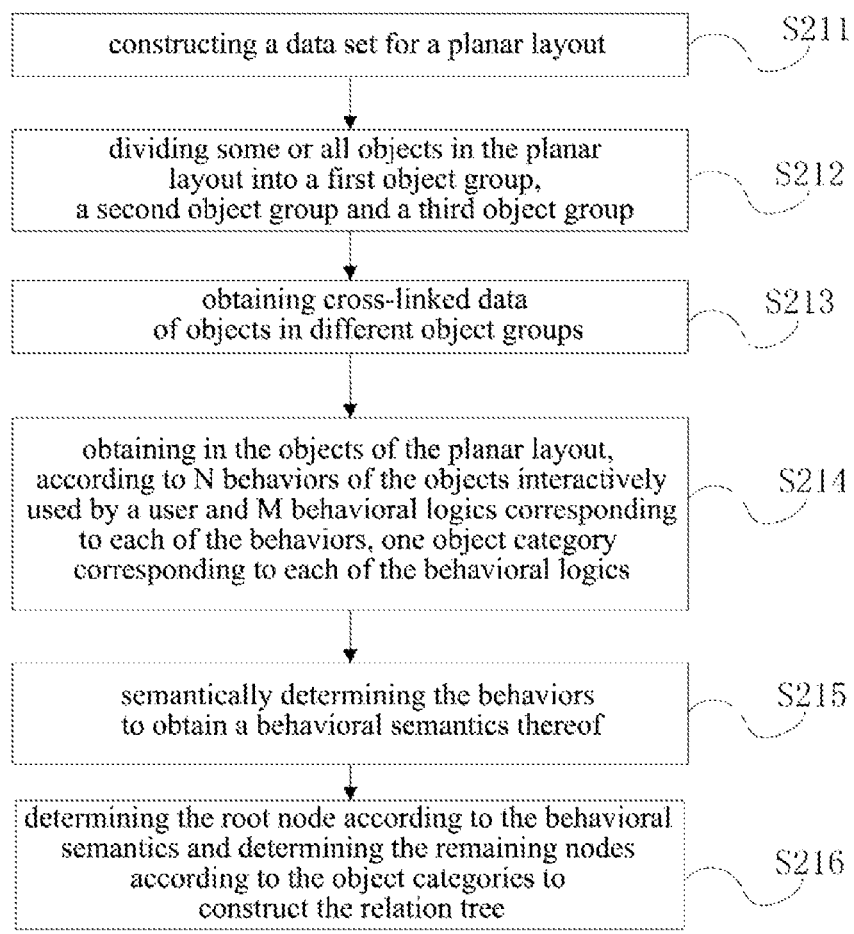
FIG. 3 is a schematic flow chart of Step S21 in FIG. 2.
Figure 7:
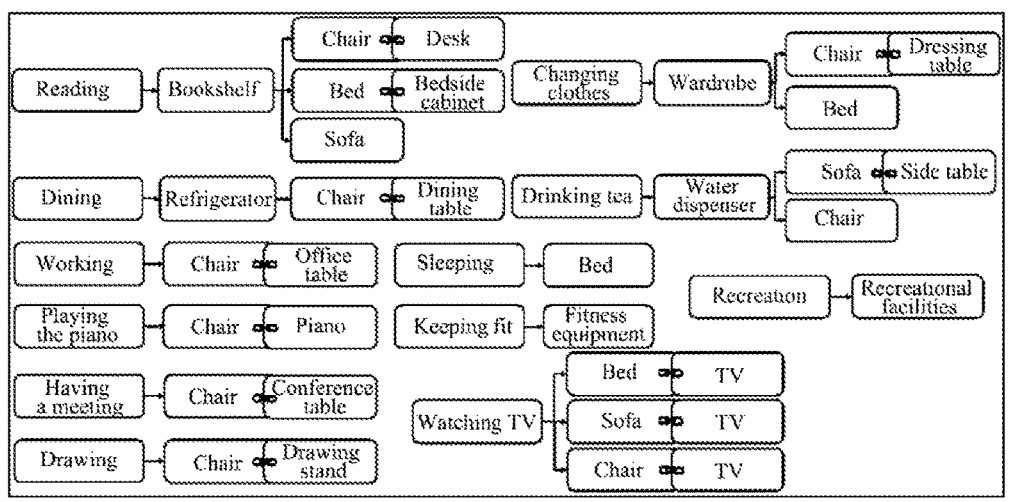
FIG. 7 is a schematic diagram of configuration of a relation tree according to the present invention.

FIG. 3 is a schematic flow chart of Step S21 in FIG. 2, and FIG. 7 is a schematic diagram of configuration of a relation tree according to the present invention; with reference to FIG. 3 and FIG. 7, Step S21 includes:

S211, constructing a data set for a planar layout.

During a specific implementation, 8 different categories of indoor scenarios (such as: a bedroom, a living room, a dining room, a study room, a conference room, an office, a gym, a canteen) may be included, and they are marked, that is, in each two-dimensional planar layout, positions and sizes of different indoor objects are marked, and meanwhile a position and an orientation of the user, as well as a blank area where furniture can be placed are marked. Correspondingly, first marked data, second marked data and third marked data may be obtained. The first marked data is marked data of the objects in the planar layout, such as the position and the size of the indoor object; the second marked data is marked data of the user in the planar layout, such as the position and the orientation of the user; the third marked data is marked data of a blank area in the planar layout, such as the blank area where the furniture can be placed.

S212, dividing parts or all of objects in the planar layout into a first object group, a second object group and a third object group, where an object in the first object group is an object stayed by the user when an interactive terminal is used, and a time stayed by a preset user is in a first time length range; an object in the second object group is an object stayed by the user when an interactive terminal is used, and a time stayed by a preset user is in a second time length range; a maximum value of the first time length range is less than a minimum value of the second time length range; an object in the third object group is an object of an interactive terminal used by the user. Stay may be conceived as being within a preset scope of the object.

The first time length range may be conceived as a time length corresponding to a short time for which the user stays, and objects in the corresponding first object group mainly include objects stayed by the user for a short time after an interaction, such as a bookshelf, a wardrobe and the like. The second time length range may be conceived as a time length corresponding to a long time for which the user stays, and objects in the corresponding second object group mainly include objects stayed by the user for a long time after an interaction, such as a sofa, a bed and the like. Objects in the third object group may be listed as a desk, a television, a computer and the like.

In addition, the objects in the first object group, the objects in the second object group and the objects in the third object group may be divided only for part objects, and objects in the layout may not be divided. Through the above division, it may be more advantageous to perform a quantitative calculation to a cross-linkage between objects, and then determine the object category according to results of the quantitative calculation.

S213, obtaining cross-linked data of objects in different object groups.

The cross-linked data may be conceived as data characterizing a possibility that the objects in different object groups are simultaneously stayed and/or interactively used by the same user, and may be listed as characterizing whether it is possible to interactively use an object in the third object group when the user stays at an object in the first object group or an object in the second object group. It may be data characterizing a possibility and an impossibility, and also may be embodied as data characterizing a quantitative ratio of the possibility.

In a specific implementation, through the marked position P and the marked orientation of the user, the cross-linked data φ of the same user for two objects $o_i$ and $o_j$ may be detected according to an ergonomic accessible area and a viewable area P of ergonomics by the following formula:

$$\varphi(o_i, o_j) = \begin{cases} 1, & p \in P_{o_i} \text{ and } P_{o_j} \cap P \neq \emptyset \\ 0, & \text{otherwise} \end{cases} ;$$

where $o_i$ and $o_j$ are two indoor objects that are detected to determine whether they are associated with each other, $P_{o_i}$ and $P_{o_j}$ are respectively projection areas thereof, whereby cross-linked data of several objects between the second object group and the third object group in the indoor objects can be obtained. In other alternative implementations, it is also possible to obtain cross-linked data between the first object group and the third object group.

S214, obtaining in the objects of the planar layout, according to N behaviors of the objects interactively used by a user and M behavioral logics corresponding to each of the behaviors, one object category corresponding to each of the behavioral logics, where the object categories includes at least one object.

Specifically, the following may be included: selecting and determining the object in each object category according to the behaviors, the behavioral logics and the cross-linked data; specifically, the following also may be included: obtaining, in the objects of the planar layout, one object category corresponding to each of the behavioral logics according to first marked data, second marked data, third marked data, the N behaviors and the M behavioral logics corresponding to each of the behaviors, where the first marked data is marked data of the objects in the planar layout, the second marked data is marked data of the user in the planar layout, and the third marked data is marked data of a blank area in the planar layout. During a specific implementation, it is possible to obtain one object category corresponding to each of the behavioral logics according to the behaviors, the behavioral logics, the cross-linked data, the first marked data, the second marked data and the third marked data.

The behavioral logics may be conceived as logics that implement an behavior. For instance, the behaviors may be behaviors such as reading, dining and drinking tea, correspondingly, the behavioral semantics may be words, such as reading, dining and drinking tea, marked by behavioral standards, an example is taken based on the drinking tea, a behavioral logic corresponding thereto may include, for instance, a first behavioral logic: sitting on a sofa for reading, where a sofa and a side table may be included under a corresponding object category; and a second behavioral logic: sitting on a chair for reading, where a chair may be included under another corresponding object category, meanwhile both object categories may include a water dispenser.

During a specific implementation, on the basis of the cross-linked data, objects that conform to the behavioral logics may be selected and determined in an automatic and/or a manual manner. After the objects that conform to the behavioral logics are selected, individual object categories may be determined respectively, then the behaviors to which the behavior logics corresponding to these object categories belong may be marked, and the behavior semantics (such as reading, dining, drinking tea, etc.) may be obtained, which may be conceived as being defined according to functions of the behaviors, and thus the relation tree may be constructed through Step S216.

S215, semantically determining the behaviors to obtain a behavioral semantics thereof.

S216, determining the root node according to the behavioral semantics and determining the remaining nodes according to the object categories to construct the relation tree.

Reference may be made to FIG. 7, for the root node, the behavioral semantics itself may be treated as a root node, for instance, the behavioral semantics such as reading, dining, working, playing the piano, having a meeting, painting, changing clothes, drinking tea, sleeping, keeping fit, recreation, and watching TV is root nodes.

For determination of the remaining nodes, the remaining nodes may be conceived as intersections for realizing relation clues of the relation tree; therefore, the determining the remaining nodes according to the object categories may be conceived as: according to different object categories, different relation clues may be found in the relation tree correspondingly, taking the root node "reading" as an example, where one of relation clues is a bookshelf, a chair and a desk, and another relation clue is a bookshelf, a bed and a bedside cabinet.

According to this embodiment, it can be seen that the cross-linkage of the indoor objects may be detected in the layout, and the relation tree may be obtained with reference to the indoor prior knowledge.

S22, determining a room, a parameter of the room and a first behavioral semantics according to entered information.

Figure 8:
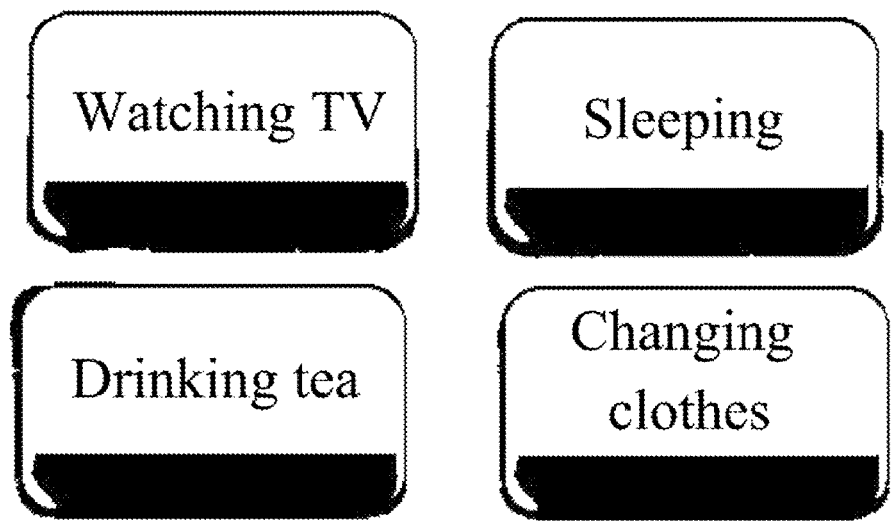
FIG. 8 is a schematic diagram of an interface of entered information according to the present invention.

FIG. 8 is a schematic diagram of an interface of entered information according to the present invention. The room may be conceived as a room where a three-dimensional scenario that needs to be constructed locates or a three-dimensional model of the room; the parameter of the room may be conceived as any parameter pertaining to construction of the room or the three-dimensional model of the room, which may include a shape of the room, a size corresponding to the shape or the like; a semantic behavior may be conceived as contents characterizing an indoor behavior of the user, which may be listed as watching TV, sleeping, drinking tea, changing clothes with reference to FIG. 8; the entered information may be any pre-marked information or information matching the pre-marked information.

S23, obtaining a corresponding first object category according to the first behavioral semantics; it may specifically include: determining, in the relation tree, a corresponding object category as the first object category according to the first behavioral semantics.

With reference to FIG. 7, for instance, for the first behavior such as drinking tea, a first object category corresponding thereto may be determined according to the relation tree; objects in the first object category corresponding thereto include a water dispenser, a sofa and a side table; objects in another first object category corresponding thereto include a water dispenser and a chair.

According to this embodiment, categories of objects are corresponding to a behavioral semantics, and during construction of a three-dimensional scenario, it is possible to realize the demand-based scenario construction through a correspondence. The behavioral semantics inputted by the user is converted to three-dimensional object categories using the relation tree, which increases a degree of automation of a three-dimensional scenario construction process and makes the whole process simple and effective.

S24, determining a corresponding first reference layout and a three-dimensional model of objects in the room according to the first object category and the parameter of the room.

The reference layout may be conceived as a preset drawing for realizing an indoor scenario layout, and the three-dimensional model of the objects may be conceived as a three-dimensional model preset by the object that can be added into a three dimensional scenario. Through the above steps, the layout and the model used for constructing the three-dimensional scenario may be determined in the preset layout and model.

This implementation uses a layout containing design prior knowledge to direct generation and construction of the three-dimensional scenario, and thus appropriateness of the layout for the generated scenario can be guaranteed.

Figure 10:
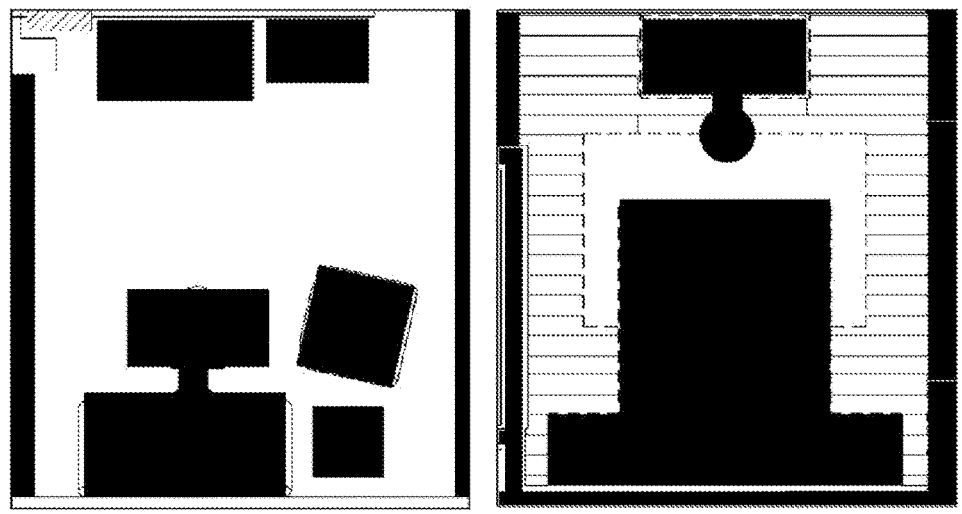
FIG. 10 is a schematic diagram of determining a first reference layout according to the present invention.

FIG. 10 is a schematic diagram of determining a first reference layout according to the present invention; with reference to FIG. 10, after determination, a layout method and corresponding marked information are determined.

Figure 4:
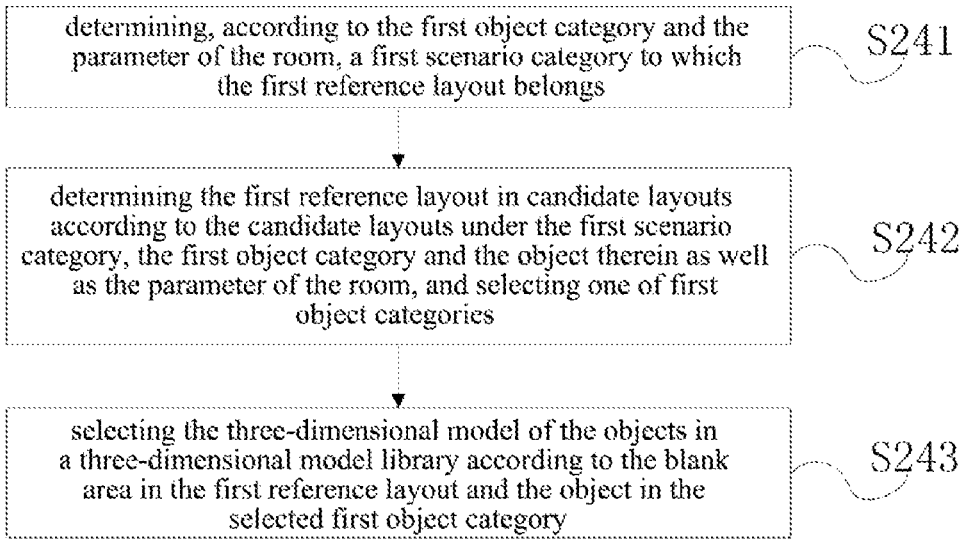
FIG. 4 is a schematic flow chart of Step S24 in FIG. 2.

FIG. 4 is a schematic flow chart of Step S24 in FIG. 2; with reference to FIG. 4, Step S24 may include:

S241, determining, according to the first object category and the parameter of the room, a first scenario category to which the first reference layout belongs. It may specifically include: determining the first scenario category according to the first object category, the parameter of the room and data about first probability, where the data about the first probability is used to indicate a probability that each object category occurs under different scenarios.

Figure 9:
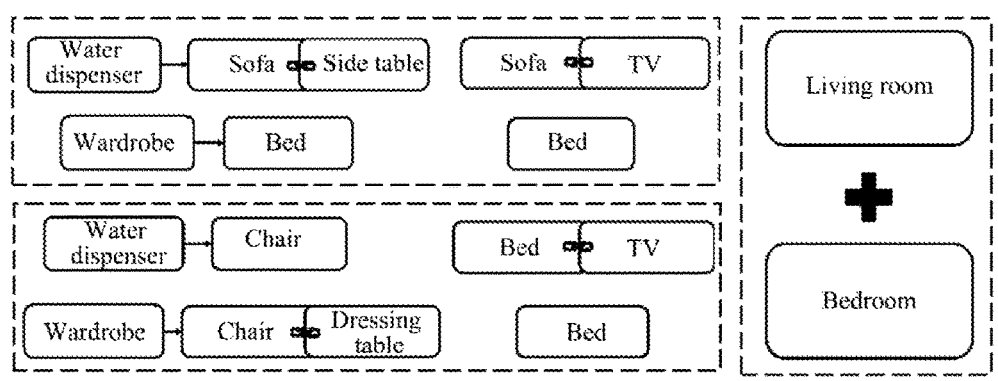
FIG. 9 is a schematic diagram of results obtained from a first object category and a first scenario category according to the present invention.

FIG. 9 is a schematic diagram of results obtained from a first object category and a first scenario category according to the present invention; with reference to FIG. 9, scenario categories may include a living room, a bedroom and the like.

During a specific implementation, according to a behavioral semantics input by the user, several sets of object categories are selected from a branch of the relation tree, these categories can meet behavioral requirements of the user, for any set of the object categories $O^\% = \{o_j\}$, $o_j$ is an object in a certain object category, according to a probability of occurrence of this object in different scenario categories which is obtained from statistics) in the layout and an average area $\phi(s_i)$ of layouts in respective categories, an appropriate first scenario category $S^\% = \{s_i\}$ may be obtained from the following formula:

$$\arg\min_{S^\%} \frac{\left|\phi(s) - \sum_{S^\%}\phi(s_i)\right|}{\phi(s)} - \frac{\omega}{|O^\%|}\sum_{o_j \in O^\%}\max_{s_i \in S^\%} P(o_j|s_i);$$

$$\text{s.t. } \max_{s_i \in S^\%} P(o_j|s_i) > 0, \forall o_j;$$

where Si is used to characterize the layout, the data about first probability may include a probability $P(o_j|s_i)$.

Thus, one or more first scenario categories may be obtained.

It is also possible to obtain scenario layout categories corresponding to respective objects in the object categories $O^\%$ according to the following formula, these categories may be used to direct a layout of an input room:

$$\sum_{o_j \in O^\%} \max_{s_i \in S^\%} P(o_j|s_i).$$

S242, determining the first reference layout in candidate layouts according to the candidate layouts under the first scenario category, the first object category and the object therein, as well as the parameter of the room, and selecting one of first object categories.

The candidate layouts may be conceived as layouts under the first scenario category.

After Step S241, that is, after the first scenario category is determined, a room feature parameter $f_r$ and an object feature parameter $f_o$ corresponding to a layout may be determined for the layout, which may specifically include:

constructing the room feature parameter $f_r$ of the layout according to a ratio $L_r$ of a short side to a long side of the room and an angle $$L\left(\frac{r}{w}, \frac{r}{d}\right)$$

between a room door and a window in relative to a central point of the room, and constructing the object feature parameter $f_o$ of the layout with a ratio $L_o$ of a short side to a long side and a ratio $\phi^\%$ of a projection area to a room area of a projection-surrounding box of the object. The room feature parameter $f_r$ of the layout and the object feature parameter $f_o$ of the layout may be represented as follow:

$$f_r = \begin{bmatrix} L_r \\ L\left(\frac{r}{w}, \frac{r}{d}\right) \end{bmatrix}, f_o = \begin{bmatrix} L_o \\ \phi^\% \end{bmatrix};$$

Figure 5:
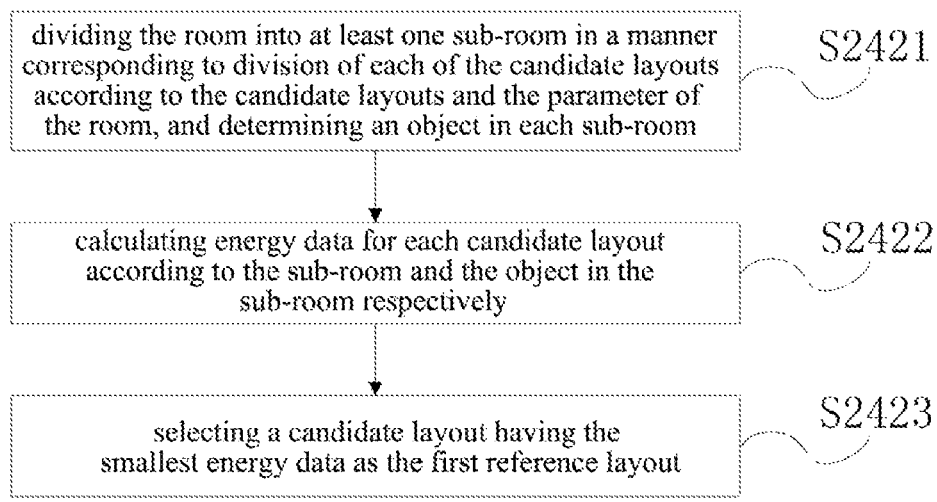
FIG. 5 is a schematic flow chart of Step S242 in FIG. 4.

FIG. 5 is a schematic flow chart of Step S242 in FIG. 4; where Step S242 includes:

S2421, dividing the room into at least one sub-room in a manner corresponding to division of each of the candidate layouts according to the candidate layouts and the parameter of the room, and determining an object in each sub-room.

S2422, calculating energy data for each candidate layout according to the sub-room and the object in the sub-room respectively; it may specifically include:

calculating and obtaining a first room feature parameter $f_r^{tar}$ of each sub-room; and calculating and obtaining a first object feature parameter $f_o^i$ corresponding to the object in each sub-room; since for the sub-room, the corresponding indoor object $o_i$ has been divided in the object categories $O^\%$, these object may be calculate the first object feature parameter $f_o^i$ according to areas of the sub-room.

In addition, it is also possible to obtain a second room feature parameter $f_r^{ref}$ of a corresponding layout and a second object feature parameter $f_o^{k_i}$ of the blank area of the corresponding layout corresponding to the object $o_i$.

The above calculating processes have no particular order.

Finally, calculating and obtaining the energy data according to the second room feature parameter $f_r^{ref}$ corresponding to the candidate layouts, the corresponding second object feature parameter $f_o^{k_i}$, the first room feature parameter $f_r^{tar}$ and the first object feature parameter $f_o^i$, where the corresponding second object feature parameter is obtained according to the blank area corresponding to objects in the candidate layouts.

Specifically, the energy data may be calculated and obtained through the following formula:

$$\text{COST} = \| f_r^{tar} - f_r^{ref} \|_2^2 + \frac{\omega^\%}{I} \min_{k \in K} \sum_{i \in I} \| f_o^i - f_o^{k_i} \|_2^2;$$

where COST is used to characterize the energy data.

S2423, selecting a candidate layout having the smallest energy data as the first reference layout. Meanwhile, a correspondence between an object in one of first object categories and an object thereof and each blank area in the first reference layout may be selected.

S243, selecting, in a three-dimensional model library, the three-dimensional model of the objects according to the blank area in the first reference layout and the object in the selected first object category. Specifically, an appropriate three-dimensional model may be retrieved from a the three-dimensional model library of corresponding category according to an object feature parameter corresponding to the blank area.

S25, directing and generating a three-dimensional indoor scenario of the room according to the first reference layout and the three-dimensional model.

Figure 6:
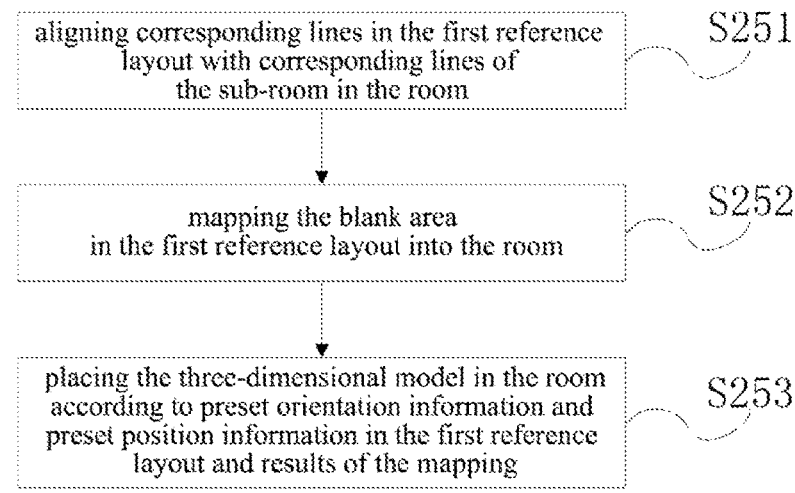
FIG. 6 is a schematic flow chart of Step S25 in FIG. 2.
Figure 11:
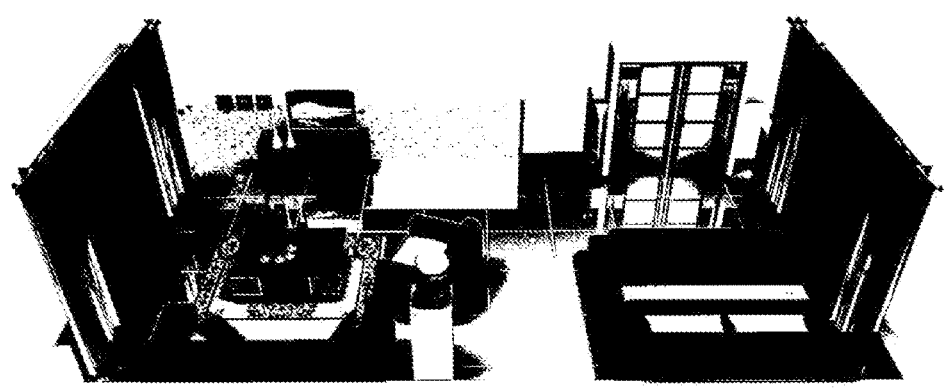
FIG. 11 is a schematic diagram of a three-dimensional indoor scenario directed and generated according to the present invention.

FIG. 6 is a schematic flow chart of Step S25 in FIG. 2, and FIG. 11 is a schematic diagram of directing and generating a three-dimensional indoor scenario according to the present invention, with reference to FIG. 6 and FIG. 11, Step S25 may include:

S251, aligning corresponding lines in the first reference layout with corresponding lines of the sub-room in the room, where the sub-room in the room is obtained by dividing the room according to the first reference layout;

S252, mapping the blank area in the first reference layout into the room; and

S253, placing the three-dimensional model in the room according to preset orientation information and preset position information in the first reference layout and results of the mapping.

Meanwhile, a similar alternative category-wide candidate model may be recommended, and the three-dimensional model is determined based on selection of the input information, thereby allowing the user to enrich results of generation of the three-dimensional scenario.

In addition, the method described in this embodiment is capable of constructing a large number of three-dimensional scenarios rapidly, and providing three-dimensional materials for the field of various applications, such as production of a three-dimensional animation and construction of a game scenario.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A method for automatic constructing a three-dimensional indoor scenario with behavior-constraint, comprising:
   determining a room, a parameter of the room and a first behavioral semantics according to entered information;
   obtaining one or more corresponding first object categories according to the first behavioral semantics;
   determining a corresponding first reference layout and a three-dimensional model of objects in the room according to the one or more corresponding first object categories and the parameter of the room; and
   directing and generating a three-dimensional indoor scenario in the room according to the first reference layout and the three-dimensional model,
   wherein before the determining the room and the first behavioral semantics according to the entered information, further comprising: constructing a relation tree, wherein a root node of the relation tree is a behavioral semantics and remaining nodes of the relation tree are one or more object categories;
   the constructing the relation tree comprises:
   constructing a data set for a planar layout;
   obtaining in objects of the planar layout, according to one or more behaviors of the objects interactively used by a user and one or more behavioral logics corresponding to each of the one or more behaviors, one object category corresponding to each of the one or more behavioral logics, wherein the one or more object categories comprise at least one object;
   semantically determining the one or more behaviors to obtain a behavioral semantics thereof; and
   determining the root node according to the behavioral semantics and determining the remaining nodes according to the one or more object categories to construct the relation tree.

2. The method according to claim 1,
   wherein the obtaining the one or more corresponding first object categories according to the first behavioral semantics comprises:
   determining, in the relation tree, one or more corresponding object categories as the one or more corresponding first object categories according to the first behavioral semantics.

3. The method according to claim 1, wherein the obtaining, according to the one or more behaviors of the objects interactively used by the user and the one or more behavioral logics corresponding to each of the one or more behaviors, one object category corresponding to each of the one or more behavioral logics specifically comprises:
   obtaining in the objects of the planar layout, according to a first marked data, a second marked data, a third marked data, the one or more behaviors and the one or more behavioral logics corresponding to each of the one or more behaviors, one object category corresponding to each of the one or more behavioral logics, wherein the first marked data is marked data of the objects in the planar layout, the second marked data is marked data of the user in the planar layout, and the third marked data is marked data of a blank area in the planar layout.

4. The method according to claim 1, wherein before the obtaining, according to the one or more behaviors of the objects interactively used by the user and the one or more behavioral logics corresponding to each of the one or more behaviors, one object category corresponding to each of the one or more behavioral logics, further comprising:

dividing some or all objects in the planar layout into a first object group, a second object group and a third object group, wherein an object in the first object group is an object stayed by the user when an interactive terminal is used, and a time stayed by a preset user is in a first time length range; an object in the second object group is an object stayed by the user when an interactive terminal is used, and a time stayed by a preset user is in a second time length range; a maximum value of the first time length range is less than a minimum value of the second time length range; an object in the third object group is an object of an interactive terminal used by the user; and obtaining cross-linked data of objects in different object groups, the cross-linked data is used to characterize a possibility that the objects in different object groups are simultaneously stayed and/or interactively used by the same user;

the obtaining, according to the one or more behaviors of the objects interactively used by the user and the one or more behavioral logics corresponding to each of the one or more behaviors, one object category corresponding to each of the one or more behavioral logics specifically comprises:

selecting and determining the object in each object category according to the one or more behaviors, the one or more behavioral logics and the cross-linked data.

5. The method according to claim 1, wherein the determining the corresponding first reference layout and the three-dimensional model of the objects according to the one or more corresponding first object categories and the parameter of the room comprises:

determining, according to the one or more corresponding first object categories and the parameter of the room, a first scenario category to which the first reference layout belongs;

determining in candidate layouts, according to the candidate layouts under the first scenario category, the one or more corresponding first object categories and the object therein as well as the parameter of the room, the first reference layout, and selecting one of the one or more corresponding first object categories; and selecting in a three-dimensional model library, according to the blank area in the first reference layout and the object in the selected first object category, the three-dimensional model of the objects.

6. The method according to claim 5, wherein the determining, according to the one or more corresponding first object categories and the parameter of the room, the first scenario category to which the first reference layout belongs comprises:

determining, according to the one or more corresponding first object categories, the parameter of the room and data about first probability, the first scenario category, wherein the data about the first probability is used to indicate a probability that each object category occurs under different scenarios.

7. The method according to claim 5, wherein the determining in the candidate layouts, according to the candidate layouts under the first scenario category, the one or more corresponding first object categories and the object therein as well as the parameter of the room, the first reference layout comprises:

dividing the room into at least one sub-room in a manner corresponding to division of each of the candidate layouts according to the candidate layouts and the parameter of the room, and determining an object in each sub-room;

calculating energy data for each candidate layout according to the sub-room and the object in the sub-room respectively; and selecting a candidate layout having the smallest energy data as the first reference layout.

8. The method according to claim 7, wherein the calculating the energy data for each candidate layout according to the sub-room and the object in the sub-room respectively comprises:

calculating and obtaining a first room feature parameter of each sub-room;

calculating and obtaining a first object feature parameter corresponding to the object in each sub-room; and calculating and obtaining the energy data according to a second room feature parameter corresponding to the candidate layouts, a corresponding second object feature parameter, the first room feature parameter and the first object feature parameter, wherein the corresponding second object feature parameter is obtained according to the blank area corresponding to objects in the candidate layouts.

9. The method according to claim 1, wherein the directing and the generating the three-dimensional indoor scenario in the room according to the first reference layout and the three-dimensional model comprises:

aligning corresponding lines in the first reference layout with corresponding lines of a sub-room in the room, wherein the sub-room in the room is obtained by dividing the room according to the first reference layout;

mapping the blank area in the first reference layout into the room; and placing the three-dimensional model in the room according to preset orientation information and preset position information in the first reference layout and results of the mapping.

* * * * *